United States Patent [19]
Nakamura et al.

[11] Patent Number: 5,814,434
[45] Date of Patent: Sep. 29, 1998

[54] COMPOSITION FOR BLACK MATRIX, FABRICATION PROCESS OF BLACK MATRIX AND ARTICLE PROVIDED WITH BLACK MATRIX

[75] Inventors: Michiei Nakamura; Keiji Nakajima; Shigeru Sakamoto; Takamitsu Shinoda; Mitsuo Yamazaki; Kanako Sato; Motohisa Maruyama; Hiroyoshi Terada; Akira Nishio; Masanori Takakamo; Toshiaki Anzai, all of Tokyo, Japan

[73] Assignees: Dainichiseika Color & Chemicals Mfg. Co., Ltd.; Ukima Colour & Chemicals Mfg. Co., Ltd, both of Tokyo, Japan

[21] Appl. No.: 636,461

[22] Filed: Apr. 23, 1996

[30] Foreign Application Priority Data

| Apr. 24, 1995 | [JP] | Japan | 7-120380 |
| Jul. 4, 1995 | [JP] | Japan | 7-189743 |
| Aug. 25, 1995 | [JP] | Japan | 7-239040 |

[51] Int. Cl.$^6$ .............. G03C 5/00; C09D 1/00; B32B 9/00
[52] U.S. Cl. .............. 430/25; 106/31.05; 106/31.95; 106/286.2; 428/697; 428/701
[58] Field of Search .............. 430/25, 23; 106/31.05, 106/31.95, 286.2; 428/697, 701

[56] References Cited

U.S. PATENT DOCUMENTS

| 3,955,023 | 5/1976 | Blakely | 428/701 |
| 4,186,023 | 1/1980 | Dumensnil et al. | 106/31.95 |
| 4,923,764 | 5/1990 | Hirose et al. | 428/697 |
| 5,081,394 | 1/1992 | Morishita et al. | 430/25 |
| 5,407,473 | 4/1995 | Miura et al. | 106/31.95 |
| 5,626,962 | 5/1997 | Yamasaki et al. | 428/701 |
| 5,648,170 | 7/1997 | Okano et al. | 428/701 |

FOREIGN PATENT DOCUMENTS

| 53-29316 | 3/1978 | Japan | 106/286.2 |
| 6-80903 | 3/1994 | Japan | 106/286.2 |

*Primary Examiner*—Roland Martin
*Attorney, Agent, or Firm*—Oblon, Spivak, McClelland, Maier & Neustadt, P.C.

[57] ABSTRACT

A composition for a black matrix is disclosed. The composition is composed of a black pigment and a binder for the pigment. The black pigment is a compound-oxide black pigment, which comprises at least two metal oxides and has a spinel or inverse-spinel crystalline structure. Also discloses are a process for the formation of a black matrix from the composition and an article provided with a black matrix so formed.

11 Claims, No Drawings

COMPOSITION FOR BLACK MATRIX, FABRICATION PROCESS OF BLACK MATRIX AND ARTICLE PROVIDED WITH BLACK MATRIX

BACKGROUND OF THE INVENTION a) Field of the Invention

This invention relates to a black-pigment-containing composition for the formation of a light-shielding black matrix on a liquid crystal (LC) display useful in a home or office image-receiving equipment such as a television or visual telephone, a video camera, a personal computer, an office equipment such as a word processor, or a display of a factory automation equipment, an automated store control equipment or a measuring equipment, a color filter of an image pick-up device or a display panel of a luminescent, full color or monochrome flat-panel display; a process for the formation of a black matrix; and an article provided with the black matrix.

More specifically, the present invention is concerned with a composition containing a black pigment and suitable for use in forming a black matrix on a filter substrate or a display panel of an LC display, a plasma address LC, a plasma display, a fluorescent display, a LED display, a CRT color display or an LC projector, said composition using as the black pigment a compound-oxide black pigment having excellent properties such as coloring power and light shielding property and superb fastness such as ultraviolet ray resistance, electron beam resistance, light resistance and heat resistance; a process for the formation of a black matrix by using the composition; and an article provided with the black matrix.

b) Description of the Related Art

In an LC color display or the like, it has heretofore been the practice to form, on a glass substrate for a color filter, a pixel pattern of three primary colors of a red color (hereinafter called "R"), a green color (hereinafter called "G") and a blue color (hereinafter called "B") in the form of a mosaic, stripe or the like for the dispersion of light, which has been transmitted from a fluorescent lamp as a back-light (light source), into spectra, so that white light from the fluorescent lamp is transmitted through the color filer and distributed into R, G and B lights and a image is displayed in full color by these distributed R, G and B lights.

In the case of a full color display panel for a luminescent flat panel display, a pixel pattern composed of R, G and B light-emitting elements is also formed on a rear glass substrate of the display panel. By lights emitted by phosphors of the three primary colors of R, G and B exited by ultraviolet rays, lights emitted by light-emitting diodes of the three primary colors of R, G and B or lights emitted by discharge gases, an image is displayed in full color.

The method making use of a color filter having pixels of the three primary colors as descried above, however, cannot avoid mutual overlapping of color lights from adjacent pixels in the color filter and hence mixing of R, G and B color lights, resulting in a deterioration in the separation of color lights by the pixels. Therefore, use of a color filter composed of R, G and B pixels alone inevitably results in a display panel which can produce only images inferior in definition and vividness.

In the case of an LC color display or the like, it has been attempted to overcome the above problem by surrounding R, G and B pixels, which are formed on a glass substrate of a color filter, with a black matrix.

Proposed as methods for the formation of a black matrix include (1) deposition of a metal such as chromium, (2) dyeing with a black dye, (3) printing with a printing ink containing carbon black, a dye mixed to present a black color, or the like, (4) photolithography making use of a photosensitive black resin composition.

The method (1) is accompanied with the drawbacks that it requires high cost, involves complex steps and cannot achieve an improvement in productivity, and requires large facilities and the like and hence high initial investment. The method (2) requires mixing of two or three dyes to attain dyeing in a black color because there is no good dye usable upon dyeing in a black color. Accordingly, this method cannot provide a black matrix having a black color of sufficient density or, even if such a black matrix is provided, its color is uneven. If a substrate on which a black matrix is formed is subjected to high-temperature treatment, the black matrix involves problems in physical properties such as heat resistance and light fastness. The method (2) therefore has not found commercial utility. As to the printing making use of a black pigment as the method (3) and the lithography making use of a photosensitive resin as the method (4), use of carbon black as the black pigment involves problems such as reduced light shielding property due to insufficient dispersion of carbon black in a black-matrix-forming composition, electrical conductivity inherent to carbon black and, where the content of carbon black is high, insufficient photocuring of a black-matrix-forming composition.

Further, black iron oxide as a black pigment is a material which is also called "magnenite". As this material has magnetic properties, particles of black iron oxide tend to coagulate in a dispersion medium due to their magnetic properties. Upon preparation of a composition for the formation of a black matrix, the pigment is hardly dispersible and, even when dispersed, the pigment has tendency to undergo premature coagulation. The black-matrix-forming composition so obtained therefore is accompanied with drawbacks such that it has inferior long-term dispersion stability, its coloring power is low, its pigment has inferior stability to oxidation by air, and a black matrix formed from the composition are gradually lowered in blackness and their color changes to a brownish color.

Considering specifically a black matrix to be formed on a color filter for a luminescent flat panel display, the formation of the black matrix includes a high-temperature baking step so that conventional black dyes, mixed dyes of black color, organic black pigments, carbon black and the like cannot be used for the formation of the black matrix. Further, black iron oxide as a black pigment, when calcined at high temperatures, changes into red iron oxide which is an iron oxide of a brown or light brown color. On the other hand, titanium black which is another black pigment also changes into white titanium oxide at 300°–350° C. Neither black dyes and pigments are hence usable as black matrix pigments which are required to have heat resistance sufficient to withstand a high-temperature calcination step.

The dyes and pigments which have heretofore been used as described above are therefore insufficient in performance as dyes for the formation of a black matrix are required to have excellent light shielding property, dispersibility, light fastness and the like.

SUMMARY OF THE INVENTION

With a view to overcoming the above-described various problems which have heretofore arisen upon formation of a black matrix, the present invention has as a primary object the provision of a black matrix which has excellent light shielding property and provides a displayed image with good definition and vividness.

To prevent mixing of the three primary colors at a display panel of an LC display or a luminescent flat panel display, the present inventors have proceeded with a variety of investigations on black pigments employed for the formation of a black matrix which surrounds pixels of the three primary colors. As a result, the present inventors have found that certain specific inorganic pigments are excellent in various physical and other properties for use in black matrices and are effective for the resolution of the above-described problems of the related art.

The present invention therefore provides a composition for a black matrix, said composition being composed of a black pigment and a binder for said pigment, wherein said black pigment is a compound-oxide black pigment comprising at least two metal oxides and having a spinel or inverse-spinel crystalline structure; a process for the formation of a black matrix, which makes use of the composition; and also an article provided with the black matrix.

According to the present invention, the composition which contains as a light shielding pigment the compound-oxide black pigment having excellent fastness and shielding property is excellent in optical properties such as blackness and optical density and is also superb in the dispersion stability in a dispersion medium. The use of the black-matrix-forming composition according to the present invention for the formation of a black matrix on a color filter of an LC display, a display panel of a luminescent flat panel display, or the like provides a black matrix—which is excellent in blackness and light shielding property and superb in fastness such as heat resistance, ultraviolet ray resistance, light resistance, chemical resistance and solvent resistance—more easily and economically compared with conventional processes. In particular, a black matrix on a display panel of a luminescent flat panel display or the like is formed by using an inorganic binder and conducting high-temperature baking. The above-described black pigment useful in the practice of the present invention is the best as a black pigment with heat resistance sufficient to withstand such high temperatures.

LC displays, luminescent flat panel display panels and the like fabricated using the black-matrix-forming composition, which pertains to the present invention and contains the compound-oxide black pigment, can achieve excellent color separation by their pixels and can hence produce images having excellent vividness and visibility.

DETAILED DESCRIPTION OF THE INVENTION AND PREFERRED EMBODIMENTS

The present invention will hereinafter be described more specifically based on certain preferred embodiments.

In the present invention, image display systems such as LD displays, plasma address LCs and LC projectors are called "LC displays", whereas image display systems such as plasma displays, fluorescent displays, LED displays and CRT color display panels are called "luminescent flat panel displays".

Further, color filter substrates or display panel substrates employed in these displays are called simply "substrates".

In the case of an LC color display, illustrative methods for the formation of a black matrix include a method in which a black matrix is formed in combination with an R, G and B pixel pattern of a color filter on a substrate and a method in which to increase the percent aperture of a pixel pattern, a black matrix is formed separately from the pixel pattern, for example, on a side of a TFT array substrate.

For a display panel of a luminescent flat panel display, there is a method in which a black matrix is applied to a rear glass substrate in registration with pixels of R, G and B light-emitting elements on a front glass substrate.

The black matrix composition according to the present invention is obtained by mixing or dispersing a the compound-oxide black pigment in a photosensitive or non-photosensitive resin varnish as will be described subsequently herein. Using this composition, a pattern is formed on a glass substrate for a color filter of an LC displays a display panel of a luminescent flat panel display, or the like by a conventionally known method, whereby a desired black matrix can be formed.

A description will next be made of the compound-oxide black pigment employed in the black matrix composition according to the present invention.

The compound-oxide black pigment useful in the practice of the present invention is a pigment composed of two or more metal oxides and has been formed by conducting calcination at a high temperature. The compound-oxide black pigment has merits such that as a pigment, it is excellent in various properties such as chemical resistance, heat resistance, light resistance, water resistance and solvent resistance, possesses excellent properties such as coloring power, hiding power and light-shielding property, shows good dispersibility in a photosensitive varnish (organic binder) as a dispersion medium for the pigment, is also excellent in the storage stability of the resulting dispersion, and even when the dispersion is mixed in a photosensitive resin, it does not practically impair the photo-curability of the varnish as the dispersion medium. Concerning heat resistance, in particular, the compound-oxide black pigment is superior to other black pigments and is stably usable up to about 800° C.

Upon fabrication of a color filter or the like, high-temperature heat treatment may be required, for example, when ITO electrodes are formed by deposition on a filter substrate or when a polyamic acid, a polyimide precursor, is used as a resin of a varnish or an oriented film for an LCD and imidation is conducted as post-treatment. The compound-oxide black pigment employed in the present invention is excellent in heat resistance so that it can be very stably used even at such high temperatures.

Such a black pigment remains stable in a high-temperature baking step upon formation of a black matrix on a display panel for a luminescent flat panel display and is therefore a pigment most suitable as a pigment for the formation of a black matrix.

Typical examples of the compound-oxide black pigment employed in the present invention include compound metal-oxide pigments of at least two metals selected as principal metal components from the group consisting of copper, chromium, iron, manganese, cobalt, aluminum, nickel, zinc, antimony, titanium, barium and the like. Each of these pigments has a spinel or inverse-spinel crystalline structure.

Specific examples of the compound-oxide black pigment include compound-oxide black pigments composed of copper and chromium as principal metal components, compound-oxide black pigments composed of copper and manganese as principal metal components, compound-oxide black pigments composed of copper, iron and manganese as principal metal components, compound-oxide black pigments composed of cobalt, chromium and iron as principal metal components, compound-oxide black pigments composed of cobalt, chromium, iron and manganese as principal metal components and compound-oxide black pigments composed of cobalt, nickel, chromium and iron. These pigments can be used either singly or in combination.

As pigments for the formation of a black matrix in the present invention, they are not limited to black pigments but even chromatic compound-oxides pigments can be used either singly or as mixtures obtained to have light shielding property provided that they are compound-oxide pigments capable of fully shielding visible lights emitted from R, G and B pixels, respectively. Upon mixing chromatic pigments to have light shielding property, these chromatic pigments alone can be mixed. It is also preferred to use one or more of the above-described black pigments as a mixture with chromatic pigments. As a hue obtained by mixing chromatic pigments to have light shielding property, a black color, a dark gray color or a dark chromatic color is desired to ensure absorption of visible light.

Illustrative examples of the above-described chromatic compound-oxide pigments include compound-oxide pigments such as C.I. Pigment Blue 28 (cobalt-aluminum system), C.I. Pigment Blue 36 (cobalt-aluminum-chromium system), C.I. Pigment Green 26 (cobalt-aluminum-chromium system), C.I. Pigment Green 50 (titanium-nickel-cobalt-zinc system), C.I. Pigment Brown 33 (iron-zinc-chromium system), and C.I. Pigment Brown 34 (iron-nickel-aluminum system). These pigments are also embraced by the expression "compound-oxide black pigment" in the present invention.

Each compound-oxide black pigment usable in the present invention can be obtained by any one of preparation processes consisting of a dry synthesis process, a wet synthesis process and a wet oxidation process. A description will hereinafter be made about these preparation processes and properties of pigments available from such processes.

According to the dry synthesis process, metal oxides as metal components for a pigment are mixed at a ratio as needed, followed by sintering at a high temperature. From example, the oxides, hydroxides, carbonates or the like of the metal components for the pigment are mixed at a desired ratio into an intimate mixture, the mixture is calcined at a temperature of about 600° C. or higher, and sintered coarse particles so formed are ground into the pigment in a pulverizer. Primary particles of the pigment obtained by the this process have an average particle size of from about 0.3 to 0.7 $\mu$m, and the BET specific surface area of the pigment is about 5 m$^2$/g or so.

According to the wet synthesis process, on the other hand, salts of the metal components for the pigment are dissolved in the same aqueous medium, an alkaline agent is added to the solution to have the respective metal salts concurrently deposited as compounds convertible to oxides by heat treatment, such as their oxides, hydroxides or the like, and the mixture so deposited is calcined and then ground into the pigment. Primary particles of the pigment obtained by this preparation process have an average particle size of from about 0.1 to 0.4 $\mu$m, and the BET specific surface area of the pigment is about 25 m$^2$/g or smaller.

Further, the wet oxidation process is a new synthesis process. According to this synthesis process, salts of at least two metals selected from copper, chromium, iron, manganese, cobalt, aluminum, nickel, zinc, antimony, titanium, barium or the like are dissolved in the same aqueous medium, an alkaline agent is added to the solution to have the mixed metal salts deposited as mixed hydroxides or the like. Either concurrently with the deposition or subsequence to the deposition, the metal hydroxides deposited in the liquid phase are subjected to oxidation treatment in the liquid phase, followed by calcination treatment, for example, calcination treatment at about 400° C. to 650° C. so that a pigment is obtained. Primary particles of the pigment obtained by this synthesis process have a BET specific surface area of at least 40 m$^2$/g and an average particle size of from about 0.01 to 0.1 $\mu$m.

Depending on the type of a synthesis process such as that described above, the mean particle size and BET specific surface area of the resulting pigment vary. A pigment having a greater particle size like a pigment obtained by the dry process or the wet process makes it possible to provide a higher pigment content when the pigment is formulated into a pigment dispersion by dispersing it in a varnish as an organic binder. At substantially the same pigment content, the above pigment can lower the viscosity of the pigment dispersion. Since a conventional compound-oxide black pigment is generally an inorganic pigment, its coloring power is inferior to an organic pigment and due to its high specific gravity, its dispersion tends to develop its settling in the course of storage over a long period of time. The inorganic pigment obtained by the above-described wet oxidation process however has been formed into extremely fine particles, so that the extremely fine particles have been significantly improved in coloring power, blackness, dispersion stability and anti-settling stability and are most suited for the object of the present invention.

A description will now be made of a preferred embodiment of the preparation of a compound-oxide black oxide by the above-described wet oxidation process. First, as salts of individual metals for the compound-oxide black oxide, those employed upon preparation of compound-oxide pigments, such as sulfates, nitrates, carbonates, chlorides, acetates and the like can all be used. Salts of these individual metal components are dissolved in water to prepare a solution of the mixed salts. The total concentration of the salts of the metal components in the aqueous solution may suitably range from about 5 to 50 wt. % or so. As an alkaline agent used for the deposition of metal hydroxides from the aqueous solution of the above-described mixed salts, a caustic alkali such as caustic soda is preferred.

The mixed metal hydroxides are caused to deposit by the alkaline agent and are then subjected to oxidation treatment. Upon oxidation treatment, the efficiency of oxidation becomes higher as the concentration of the metal hydroxides becomes lower. A lower concentration of the metal hydroxides is therefore effective of the formation of the pigment as finer particles. For these reasons, the concentration of metal hydroxides upon oxidation treatment is suitably from 0.05 to 0.5 mole/liter as calculated based on the principal metal salts. The pH of the solution at the time of the deposition of the hydroxides or the oxidation treatment is preferably in a range of from 7 to 13. The preferred synthesis temperature of the metal hydroxides can be in a range of from 20° to 40° C. and the heir preferred agent temperature thereof can be in a range of from 70° to 100° C.

In the wet oxidation process, it is essential to treat the mixed metal hydroxide, which has been caused to deposit by the alkaline agent, in such a way that their metal ions are each oxidized from a lower valence to a higher valence, for example, to convert divalent metal ions to trivalent metal ions. As an oxidizing agent for use in the above oxidation, any oxidizing agent can be used such as hydrogen peroxide, sodium peroxide, sodium chlorate, air or oxygen gas. However, an oxidizing agent which does not form any impurity by oxidation, for example, a hydrogen peroxide solution, air or oxygen gas is a preferred oxidizing agent.

Subsequent to the above-described oxidation treatment, the resultant oxide is filtered and dried. The filter cake so dried is then calcined. The calcination is conducted at 400°–650° C. for 30 minutes to 1 hour in an oxidizing atmosphere so that the dried dry cake is converted into a compound-oxide pigment having the perfect spinel structure. According to this wet oxidization process, the oxidizing treatment of the precipitated mixed metal hydroxides in the water phase makes it possible to form primary particles of the pigment of the single spinel structure as very fine particles even at a relatively low calcination temperature. The pigment so obtained is in the form of soft particles, thereby bringing about the merit that its dry grinding or wet milling is easy.

In the present invention, the compound-oxide black pigment can be surface-treated, as needed, with at least one coating material selected from the group consisting of at least one coating material selected from the group consisting of silicon oxide or vitreous inorganic materials, hardenable polymers, and polymers substantially insoluble in a medium.

The surface treatment of the compound-oxide black pigment with such a coating material makes it possible to impart properties such as chargeability and medium compatibility to the pigment. This improves the dispersibility of the pigment in a varnish as a dispersion medium upon preparation of the composition of this invention for the black matrix and also during storage of the composition, and also improves the re-dispersibility, dispersion stability and the like of the pigment subsequent to the storage of the composition. When the pigment is treated with a silicon oxide or vitreous inorganic material, the pigment exhibits improved compatibility with a low m.p. glass binder during calcination upon formation of a black matrix. This improved compatibility facilitates baking of the black matrix to a glass substrate.

Illustrative examples of the silicon oxide or vitreous inorganic material as a surface-treatment agent for the pigment include hydrogenated amorphous silica, anhydrous amorphous silica, mixtures thereof, and low m.p. vitreous materials.

The surface treatment of the pigment by the inorganic material can be carried out in a manner similar to a coating method for a conventionally-known pigment with silica or a vitreous material. For example, the compound-oxide black pigment is dispersed in a finely-divided form in water, and an aqueous solution of sodium silicate, potassium silicate or the like (with optional addition of an aqueous solution of lead nitrate) and a dilute aqueous solution of sulfuric acid are simultaneously dropped or poured into the dispersion, followed by stirring. As an alternative, the pigment is dispersed in a finely-divided form in a solvent such as ethanol, and tetraethyl orthosilicate, tetramethyl orthosilicate or the like (with optional addition of an organolead compound) is added to the dispersion so that the silicate is hydrolyzed and condensed to deposit as films on surfaces of the pigment. In this manner, the pigment is obtained in a coated form.

The black pigment has been almost uniformly surface-treated with amorphous silica, a low m.p. vitreous material or a mixture thereof as described above. Subsequent to the surface treatment, the black pigment is thoroughly washed with water to eliminate soluble salts and other water-soluble substances and after drying, is used for the formation of a black matrix.

The inorganic coating material is required in an amount sufficient to coat the surfaces of the black pigment. Specifically, the inorganic coating material is used in a proportion of 1–100 parts by weight, preferably 3–50 parts by weight per 100 parts by weight of the pigment. It is desired to treat the pigment with the coating material in an amount suitably chosen depending on the particle size and specific surface area of the particles of the pigment to be coated. The amount of the coating material to be used may be determined using as an index an oil absorption of the pigment to be coated. This coating can be conducted a plurality of times for the same black pigment.

Use of the coating material in an unduly small amount cannot sufficiently improve the dispersibility, dispersion stability and the like of the pigment. An unduly large amount, however, results in a lower content of the pigment in a resulting black-matrix-forming composition, and is not desired because the surface-treated pigment is required in a large amount to surely achieve a degree of pigmentation which is needed for a black matrix to be formed.

Hardenable polymers usable as coating materials include conventionally-known hardenable resins, for example, curable amino resins, curable epoxy resins, curable phenol resins, curable urethane resins, crosslinkable unsaturated polyester resins, and crosslinkable poly(meth)acrylate resins.

In addition, even non-hardenable polymers are usable as coating materials for the pigment, provided that they are substantially insoluble in solvents, chemicals or the like which are used in the fabrication steps of color filters. Illustrative examples of polymers substantially insoluble in these solvents include polyamide resins, polyimide resins, and polyamideimide resins.

Where these organic materials which can form such insoluble coating are hardenable resins, they are each used in a soluble form, for example, in the form of monomer(s), an initial condensation product or the like as known in the art, optionally in combination with an appropriate crosslinking agent, curing agent, catalyst, polymerization initiator or the like. In the case of non-hardenable polymers, each of them can be used in a form dissolved in a solvent in which the polymer is soluble.

The surface treatment of the compound-oxide black pigment by such an organic coating material is conducted by dispersing the pigment in a finely-divided form in water or a solvent, dropping or pouring the organic coating material into the dispersion under stirring in a manner commonly employed for the formation of coating, for example, in the form of an aqueous solution, an emulsion, a solvent solution or the like, optionally heating the resultant mixture, and then adding a curing agent such as an amine, curing catalyst such as an alkali or a polymerization initiator.

The coated pigment so obtained has been almost uniformly surface-treated with the polymer which is substantially insoluble in the medium. Similarly to the foregoing, this polymer is also required in an amount sufficient to coat the surfaces of the black pigment. Specifically, the polymer is used in an amount of 1–100 parts by weight, preferably 3–50 parts by weight per 100 parts by weight of the pigment. The amount of the polymer to be used may be determined using as an index the particle size, specific surface area and oil absorption of the pigment to be coated.

This coating with the silicon oxide or vitreous inorganic material, hardenable polymer or insoluble polymer can be conducted a plurality of times for the same black pigment.

Subsequent to the surface treatment, the coated pigment is thoroughly washed with water to eliminate soluble salts and other water-soluble substances and after drying, is used for the formation of a black matrix.

As has been described above, it is one of the merits of the compound-oxide black pigment that as a result of the calcination of the pigment at a high temperature, the pigment is composed of a compound metal oxide having the specific crystalline structure. It therefore has high heat resistance as a pigment and exhibits sufficient heat resistance even at temperatures where organic substances burn off upon formation of a black matrix, for example, at 450°–900° C.

Therefore, when a display panel is fabricated by subjecting a black matrix to high-temperature treatment subsequent to its patterning as in the case of a display panel for a luminescent flat panel display, a composition according to the present invention in which the compound-oxide black pigment is added with a low m.p. glass frit as an inorganic binder, an organosilica compound such as ethoxy silica and an organolead compound can be effectively used for the formation of the black matrix. It is also possible to form a black matrix by coating beforehand a substrate with a low m.p. glass frit over the entire surface thereof or on regions where the matrix is to be formed, patterning the black matrix with the composition according to the present invention and then baking the thus-patterned composition.

The low m.p. glass frit employed as a binder for the pigment in the composition according to the present invention can be, for example, fine powder of a lead borosilicate glass formed of lead oxide, silicon oxide and boron silicate as principal components. Depending on the composition, such glass frits range from a low-temperature baking glass frit whose baking temperature is about 500° C. to a high-temperature baking glass frit whose baking temperature is about 700° C. These frits have been added with sodium oxide, titanium oxide, zirconium oxide, lithium oxide, aluminum oxide and/or the like as subordinate components.

Regarding the black-matrix-forming composition according to the present invention, its formulation, varnish and additives are determined depending on the coating method of the composition on a substrate, the formation method of the pattern.

Illustrative examples of the method for printing the black matrix composition according to the present invention on a substrate for the formation of a black matrix include various printing methods such as stencil screen printing, intaglio gravure printing, offset intaglio printing, offset lithographic printing and letterpress printing; electrodeposition; electronic printing; electrostatic printing; and thermal transfer.

The black-matrix-forming composition according to the present invention can be converted into a photosensitive black-matrix-forming composition by using a photosensitive resin as at least a portion of its binder. For the formation of a black matrix from the photosensitive black-matrix-forming composition of the present invention by photolithography, the composition is coated over the entire surface of a substrate by spin coating, roll coating or the like and, subsequent to formation of a rough pattern by photolithography, a printing method, thermal transfer or the like, a precise pattern is then formed by photolithography.

Usable components for the composition according to the present invention include, in addition to the compound-oxide black pigment and the inorganic binder, a varnish as an organic binder for dispersing the pigment. As the varnish, a suitable, conventionally-known, non-photosensitive or photosensitive varnish is chosen depending on the coating method and the pattern forming method.

Illustrative examples of the non-photosensitive varnish include varnishes useful in printing inks such as stencil screen inks, intaglio gravure inks, offset lithographic inks and letterpress inks; varnishes useful for electrodeposition; varnishes useful in developers for electronic printing and electrostatic printing; and varnishes useful in thermal transfer ribbons. Illustrative examples of the photosensitive varnish include photosensitive resin varnishes useful in ultraviolet ray curing inks, electron beam curing inks and the like. Besides these varnishes, varnishes suited for the above-described coating methods and photolithographic methods can also be used.

Illustrative examples of the non-photosensitive binder include cellulose acetate butyrate resins, nitrocellulose resins, styrene (co)polymers, polyvinyl butyral resins, aminoalkyd resins, polyester resins, amino-resin-modified polyester resins, polyurethane resins, acrylic polyol urethane resins, soluble polyamide resins, soluble polyimide resins, casein, hydroxyethylcellulose, water-soluble salts of styrene-maleate ester copolymers, water-soluble salts of (meth)acrylate ester (co)polymers, water-soluble aminoalkyd resins, water-soluble amino-resin-modified polyester resins, and water-soluble polyamide resins. These binders can be used either singly or in combination. The black-matrix-forming composition according to the present invention can be obtained by mixing, dispersing and kneading the compound-oxide black pigment with the binder by a conventionally-known method.

Illustrative examples of a photosensitive resin varnish usable in the black-matrix-forming composition according to the present invention include ultraviolet ray curing inks, electron beam curing inks and the like. Particularly preferred are photosensitive resin varnishes which are used for the formation of patterns by photolithography and etching. Specific examples include varnishes obtained by adding conventionally-known multifunctional acrylic monomers as reactive diluents to photosensitive cyclizing rubber resins, photosensitive phenol resins, photosensitive (meth)acrylic resins, photosensitive styrene-(meth)acrylic resins, photosensitive polyamide resins, photosensitive polyimide resins, photosensitive unsaturated polyester resins, polyester acrylate resins, polyepoxy acrylate resins, polyurethane acrylate resins, polyether acrylate resins and polyol acrylate resins; and varnishes obtained by adding an organic solvent or an aqueous medium to the first-mentioned varnishes as needed. The photosensitive black-matrix-forming composition according to the present invention can be obtained by adding a photopolymerization initiator such as benzoin ethyl ether or benzophenone to a mixture of the compound-oxide black pigment and the varnish and then kneading the resultant mixture by a conventionally-known method.

To form a black matrix by using the above-described photosensitive black-matrix-forming composition, the composition is evenly coated on a substrate by a coating method such as spin coating or roll coating and subsequent to predrying, a photomask is applied in close contact with the thus-coated substrate, followed by exposure and curing under an extra-high pressure mercury lamp. The resulting layer is then subjected to development and washing and, if necessary, further to post baking, whereby a black matrix can be formed.

Use of a thermal polymerization initiator in place of the photopolymerization initiator makes it possible to provide a thermally-polymerizable, black-matrix-forming composition according to the present invention.

The proportion of the organic binder in the black-matrix-forming composition according to the present invention is in a range of from 5 to 300 parts by weight, preferably from 10 to about 200 parts by weight per 100 parts of the compound-oxide black pigment.

In the case of the black-matrix-forming composition according to the present invention in which the low m.p. glass frit as an inorganic binder is used as a binder, the proportion of the inorganic binder is in a range of from 5 to 200 parts by weight, preferably from 10 to about 100 parts by weight per 100 parts by weight of the pigment. As a calcination temperature upon forming a black matrix with the composition, it is desired to calcine at a temperature such that the organic binder contained in the composition is burnt off in its entirety, the inorganic binder also contained in the composition is molten and the compound-oxide black pigment is fixed on a substrate. For example, about 450°–900° C. is desired as the calcination temperature.

Black matrices formed as described above are suited especially for various color displays. They are useful as color filters for LC displays and also as black matrices for LC displays, LC projectors, plasma address LC's and the like. They can also be used as color plasma display panels, that is, display panels in luminescent flat panel displays and also as black matrices in fluorescent display color display panels, luminescent diode color display panels, CRT color display panels an the like, whereby they can eliminate color blurring or color overlapping in displayed images and can provide the displayed images with vividness and good definition.

The article, which pertains to the present invention and is provided with the black matrix, is characterized in that a black matrix has been formed on a color filter of an LC display or a display panel of a luminescent flat panel display, such as that described above, by using the above-described black-matrix-forming composition according to the present invention.

A fabrication process of an LC color display will now be described based on one example thereof. An R, G and B color filter and a black matrix are formed on a color filter substrate. An oriented film for the LC color display is formed, followed by rubbing treatment, the printing of seals and the formation of transfer electrodes. On an array substrate, on the other hand, TFT elements are formed, followed by the formation of an oriented film for the LC color display, rubbing treatment, and the spreading of a spacer. The array substrate and the color filter substrate are then bonded together, followed by the filling of a liquid crystal, the sealing of cells, the bonding of polarizers, etc. so that a color LC panel is obtained. Through a module assembly step in which an integrated driver circuit and an integrated control circuit are connected to the panel and an illuminating backlight or the like is mounted, an LC color display is fabricated.

R, G and B coloring compositions for the formation of R, G and B pixels on a color filter can be those known to date, and the formation of the individual pixels can be conducted by a conventionally known method. Preferred examples of usable R, G and B pigments include C.I. Pigment Red 122, 123, 149, 177, 179, 190, 194, 207, 209 and so on; C.I. Pigment Yellow 24, 108, 109, 110, 166 and so on; C.I. Pigment Green 7, 36, 37 and so on; and C.I. Pigment Blue 15, 60, 66 and so on.

The pixels of the color filter are not limited to a combination of the three primary colors, and other combinations such as those of three primary colors of indigo-blue, magenta and yellow are of course feasible.

In the case of a color filter for an LC display or a like filter, the black-matrix-forming composition according to the present invention can be added further with one or more conventionally-known pigments, for example, to provide the resulting black matrix with an increased blackness so that a higher optical density can be obtained. Preferred as usable pigments are those having excellent fastness, superb electrical and physical properties, high coloring power, and a black color or a hue permitting easy toning into a black color. Illustrative examples of black pigments include C.I. Pigment Black 6, 7, 8, 9 and 10, the azomethineazo black pigments disclosed in Japanese Patent Publication (Kokoku) No. HEI 4-15265, and C.I. Pigment Black 31 and 32.

As an example of fabrication of a display panel for a luminescent flat panel display, a description will next be made of fabrication of a display panel for a color plasma display.

Using the black-matrix-forming composition according to the present invention, a black matrix of a grid pattern is formed on a front glass substrate by a method similar to that described above. Formed next are transparent electrodes, metal electrodes, a transparent dielectric layer, stripe partitions, seal layers, and a magnesium oxide layer. Formed on a rear glass substrate are data electrodes, a white dielectric layer, stripe partitions, blue, green and red phosphor layers, and seal layers. The thus-formed front glass substrate and rear glass substrate are assembled. Sealing, evacuation and gas filling steps are then performed. The assembly so obtained is connected to a circuit unit so that a display panel for a color plasma display is fabricated.

R, G and B compositions for the formation of R, G and B pixels on a display filter of a luminescent flat panel display can be those known to date, and the formation of the individual pixels can be conducted by a conventionally known method. For example, preferred examples of phosphor pigments usable for color plasma display panels include $(Y,Gd)BO_3$:Eu as a red phosphor, $BaAl_{12}O_{19}$:Mn and $Zn_2SiO_4$:Mn as green phosphors, and $BaMgAl_{14}O_{23}$:$Eu^{2+}$ and $BaMg_2Al_{16}O_{27}$:Eu as blue phosphors. Further, illustrative LEDs include InGaN-system blue LEDs, GaAlAs-system red LEDs, and GaP-system green LEDs.

The present invention will next be described more specifically by the following Synthesis Examples and Examples of pigments useful in the practice of the present invention. All designations of "part" or "parts" and "%", which will follow, refer to part or parts by weight and wt. % unless specified otherwise.

Synthesis Example 1

A copper-iron-manganese compound-oxide black pigment (C.I. Pigment Black 26) was synthesized by a wet synthesis process. Specifically, measured were 120 parts of copper sulfate, 104 parts of iron sulfate heptahydrate and 170 parts of manganese sulfate. They were completely dissolved in about 800 parts of water, whereby an aqueous solution of the mixed salts was prepared. Next, 240 parts of caustic soda were measured as a precipitant and were then dissolved in about 800 parts of water, so that an aqueous solution was prepared. Further, 800 parts of water were provided, to which the aqueous solution of the mixed salts and aqueous solution of caustic soda, both prepared above, were simultaneously added dropwise under stirring at 26° C. A precipitation reaction was brought to completion in about 30 minutes to 1 hour.

The reaction mixture was filtered and the resulting filtrate was washed with water to thoroughly wash away soluble salts, whereby a filter cake was obtained. This filter cake was dried at 100°–120° C. for 8 hours or longer. The dried filter cake so obtained was calcined at 520° C. for 1 hour in an oxidizing atmosphere. Primary particles of a copper-iron-manganese compound-oxide black pigment (hereinafter called "BK-1") so obtained had an average particle size of about 0.1 µm and a BET surface area of about 25 m$^2$/g.

Synthesis Example 2

In a manner as in Synthesis Example 1, a copper-chromium compound oxide (C.I. Pigment Black 28) was synthesized. Caustic soda was added as a precipitant to an aqueous solution of copper sulfate and chromium sulfate to conduct a precipitation reaction. Subsequent to filtration, water washing and drying, the dried filter cake so obtained was calcined at 520° C. Primary particles of a copper-chromium compound-oxide black pigment (hereinafter called "BK-2") so obtained had an average particle size of about 0.2 µm.

Synthesis Example 3

In a manner as in Synthesis Example 1, a cobalt-chromium-iron compound oxide was synthesized. Caustic soda was added as a precipitant to an aqueous solution of cobalt sulfate, chromium sulfate and iron sulfate to conduct a precipitation reaction. Subsequent to filtration, water washing and drying, the dried filter cake so obtained was calcined at 520° C. Primary particles of a cobalt-chromium-iron compound-oxide black pigment (hereinafter called "BK-3") so obtained had an average particle size of about 0.05 µm.

Synthesis Example 4

In a manner as in Synthesis Example 1, a cobalt-chromium-iron-manganese compound oxide was synthesized. Caustic soda was added as a precipitant to an aqueous solution of cobalt sulfate, chromium sulfate, iron sulfate and manganese sulfate to conduct a precipitation reaction. Subsequent to filtration, water washing and drying, the dried filter cake so obtained was calcined at 520° C. Primary particles of a cobalt-chromium-iron-manganese compound-oxide black pigment (hereinafter called "BK-4") so obtained had an average particle size of about 0.1 µm.

Synthesis Example 5

In a manner as in Synthesis Example 1, a cobalt-nickel-chromium-iron compound oxide was synthesized. Caustic soda was added as a precipitant to an aqueous solution of cobalt sulfate, nickel sulfate, chromium sulfate and iron sulfate to conduct a precipitation reaction. Subsequent to filtration, water washing and drying, the dried filter cake so obtained was calcined at 520° C. Primary particles of a cobalt-nickel-chromium-iron compound-oxide black pigment (hereinafter called "BK-5") so obtained had an average particle size of about 0.1 µm.

Synthesis Example 6

A copper-iron-manganese compound-oxide black pigment was synthesized in the form of fine particles by a wet synthesis process. Specifically, measured were 120 parts of copper sulfate, 104 parts of iron sulfate heptahydrate and 170 parts of manganese sulfate. They were completely dissolved in about 800 parts of water, whereby an aqueous solution of the mixed salts was prepared. Next, 240 parts of caustic soda were measured as a precipitant and were then dissolved in about 800 parts of water, so that an aqueous solution was prepared. Further, 800 parts of water were provided, to which the aqueous solution of the mixed salts and aqueous solution of caustic soda, both prepared above, were simultaneously added dropwise under stirring at 26° C. A precipitation reaction was conducted at pH 12 for about 30 minutes to 1 hour. After completion of the dropwise addition, 100 parts of a 35% aqueous solution of hydrogen peroxide were added dropwise while maintaining the pH, whereby oxidation treatment was conducted. Completion of the oxidation reaction at that time was confirmed by measuring an oxidation-reduction potential.

After the completion of the oxidation treatment, the temperature of the reaction mixture was changed to 70° C. and aging was then conducted for about 1 hour or so. The reaction mixture was then filtered and the resulting filtrate was washed with water to thoroughly wash away soluble salts, whereby a filter cake was obtained. This filter cake was dried at 100°–120° C. for 8 hours or longer. The dried filter cake so obtained was calcined at 520° C. for 1 hour in an oxidizing atmosphere. A pigment so obtained was in the form of small primary particles, whose particle sizes ranged from about 0.01 to 0.06 µm. Their BET specific surface area was about 56 m$^2$/g. The pigment was a copper-iron-manganese compound-oxide, fine particulate black pigment (hereinafter called "BK-6") which had good blackness, coloring power and dispersibility and showed a bluish black color.

Synthesis Example 7

In a manner as in Synthesis Example 6, 120 parts of copper sulfate, 104 parts of iron sulfate heptahydrate and 170 parts of manganese sulfate were measured. They were completely dissolved in about 800 parts of water, whereby an aqueous solution of the mixed salts was prepared. Next, 240 parts of caustic soda were measured as a precipitant and were then dissolved in about 800 parts of water, so that an aqueous solution was prepared. Further, 800 parts of water were provided, to which the aqueous solution of the mixed salts and aqueous solution of caustic soda, both prepared above, were simultaneously added dropwise under stirring while maintaining the resulting mixture at 26° C. A precipitation reaction was conducted at pH 12. After completion of the precipitation reaction, the reaction mixture was bubbled under stirring while feeding air at a flow rate of 50 liters/min through a bottom of a reaction tank, so that oxidation treatment was conducted. Completion of the oxidation reaction at that time was confirmed by monitoring an oxidation-reduction potential.

After the completion of the oxidation treatment, the temperature of the reaction mixture was changed to 70° C. and aging was then conducted for about 1 hour or so. The reaction mixture was then filtered and the resulting filtrate was washed with water to thoroughly wash away soluble salts, whereby a filter cake was obtained. This filter cake was dried at 100°–120° C. for 8 hours or longer. The dried filter cake so obtained was calcined at 520° C. for 1 hour in an oxidizing atmosphere. A pigment so obtained was in the form of small primary particles, whose particle sizes ranged from about 0.01 to 0.05 µm. Their BET specific surface area was about 60 m$^2$/g. The pigment was a copper-iron-manganese compound-oxide, fine particulate black pigment (hereinafter called "BK-7") which had good blackness, coloring power and dispersibility and showed a bluish black color.

Synthesis Example 8

In a manner as in Synthesis Example 6, 120 parts of copper sulfate and 227 parts of manganese sulfate were measured. They were completely dissolved in about 800 parts of water, whereby an aqueous solution of the mixed salts was prepared. Next, 240 parts of caustic soda were measured as a precipitant and were then dissolved in about 800 parts of water, so that an aqueous solution was prepared. Further, 800 parts of water were provided, to which the aqueous solution of the mixed salts and aqueous solution of caustic soda, both prepared above, were simultaneously added dropwise while maintaining the resulting mixture at 26° C. A precipitation reaction was conducted at pH 12. After completion of the dropwise addition, a 35% aqueous solution of hydrogen peroxide was added dropwise while maintaining the pH, whereby oxidation treatment was conducted.

After the completion of the oxidation treatment, the temperature of the reaction mixture was changed to 70° C. and aging was then conducted for about 1 hour or so. The reaction mixture was then filtered and the resulting filtrate was washed with water to thoroughly wash away soluble salts, whereby a filter cake was obtained. This filter cake was dried at 100°–120° C. for 8 hours or longer and further, was calcined at 520° C. for 1 hour in an oxidizing atmosphere. A pigment so obtained was in the form of small primary particles, whose particle sizes ranged from about 0.01 to 0.08 μm. Their BET specific surface area was about 42 m$^2$/g. The pigment was a copper-manganese compound-oxide, fine particulate black pigment (hereinafter called "BK-8") which had good blackness, coloring power and dispersibility and showed a bluish black color.

Synthesis Example 9

The compound-oxide black pigment "BK-1" obtained in Synthesis Example 1 was surface-treated with a siliceous material. Specifically, five hundred parts of the black pigment "BK-1" were taken, to which 3 parts of an aqueous solution of sodium silicate (29% as silicic anhydride) and 1,000 parts of water were added to wet the pigment. The pigment was thoroughly dispersed in an attritor filled with steel balls until the mixture became a uniform flowable slurry. The slurry so obtained was caused to pass through a screen, whereby the slurry was separated from the steel balls. The slurry was diluted with water to give a total volume of 10,000 parts by volume. On the side, 380 parts of an aqueous solution of sodium silicate (29% as silicic anhydride) were diluted with water to give a total volume of 1,700 parts by volume.

Further, 1,700 parts of a 3.30% aqueous solution of sulfuric acid were provided. The pigment dispersion was heated to 90° C., to which a dilute aqueous solution of sodium hydroxide was added to adjust the pH to 10.0. To the mixture so obtained, the dilute aqueous solution of sodium silicate and the dilute aqueous solution of sulfuric acid, both prepared above, were added dropwise. Their dropped amounts were controlled so that the reaction mixture remained alkaline. Subsequent to completion of the addition of both the solutions, stirring was continued for 1 hour, followed by the addition of dilute sulfuric acid to adjust the pH to 6.5–7.0. The slurry so obtained was filtered. The resulting filter cake was washed until soluble salts were eliminated, followed by drying, whereby 600 parts of a silica surface-treated, black, fine particulate compound-oxide pigment (hereinafter called "BK-9") were obtained. The amount of silica so coated was about 20% based on the pigment.

Synthesis Example 10

To 500 parts of the compound-oxide black pigment "BK-1" obtained in Synthesis Example 1, 1,000 parts of a 10% aqueous solution of methanol, said solution containing 10 parts of an anionic dispersant, were added, whereby the pigment was wetted. Further, 4,000 parts of water were added, followed by thorough dispersion of the resultant mixture in an attritor filled with steel balls until the mixture became a uniform viscous slurry. The slurry so obtained was caused to pass through a screen, whereby the slurry was separated from the steel balls. The slurry was diluted with water to give a total volume of 10,000 parts by volume. On the side, 167 parts of an aqueous solution of sodium silicate (30% as silicic anhydride) were diluted with water to give a total volume of 1,000 parts by volume. Further, 1,000 parts of a 2.50% aqueous solution of sulfuric acid were provided.

Similarly to the surface treatment method for the pigment in Synthesis Example 6, the pigment dispersion which had been heated to 90° C. was adjusted to pH 10.0 with a dilute aqueous solution of sodium hydroxide. To the mixture so obtained, the dilute aqueous solution of sodium silicate and the dilute aqueous solution of sulfuric acid, both prepared above, were added dropwise under control so that the reaction mixture remained alkaline. Subsequent to completion of the addition of both the solutions, stirring was continued for 1 hour, followed by the addition of dilute sulfuric acid to adjust the pH to 6.5–7.0. The slurry so obtained was filtered. The resulting filter cake was washed, followed by drying, whereby 550 parts of a surface-treated, black compound-oxide pigment (hereinafter called "BK-10") were obtained. The amount of the surface treatment material was about 10% based on the pigment. When the frictional electricity of "BK-10" so obtained was measured by the blow-off method, a negative value was indicated so that an improvement in electrical insulating property was observed.

Synthesis Example 11

Similarly to the surface treatment method for the pigment in Synthesis Example 9, 500 parts of the fine particulate, compound-oxide black pigment "BK-6" obtained in Synthesis Example 6 were taken, to which a 10% aqueous solution of methanol, said solution containing an anionic dispersant, and water were added. The pigment was thoroughly dispersed in an attritor, followed by the dilution with water to give a total volume of 1,000 parts by volume. On the side, 167 parts of an aqueous solution of sodium silicate were diluted with water to give a total volume of 1,000 parts by volume. Further, 1,000 parts of a 2.50% aqueous solution of sulfuric acid were provided. Similarly to the surface treatment method for the pigment in Synthesis Example 9, the pigment dispersion which had been heated to 90° C. was adjusted to pH 10.0 with a dilute aqueous solution of sodium hydroxide. To the mixture so obtained, the dilute aqueous solution of sodium silicate and the dilute aqueous solution of sulfuric acid, both prepared above, were added dropwise under control so that the reaction mixture remained alkaline. Subsequent to completion of the addition of both the solutions, the resulting mixture was stirred for 1 hour, followed by the adjustment to pH 6.5–7.0 with dilute sulfuric acid. The slurry so obtained was then filtered. The resulting filter cake was washed, followed by drying, whereby 550 parts of a surface-treated, black compound-oxide pigment (hereinafter called "BK-11") were obtained. The amount of the surface treatment material was about 10% based on the pigment. When the frictional electricity of "BK-11" so obtained was measured by the blow-off method, a negative value was indicated so that an improvement in electrical insulating property was observed.

Synthesis Example 12

The compound-oxide black pigment "BK-6" obtained in the form of fine particles in Synthesis Example 6 was surface-treated with a siliceous material. Specifically, like the surface treatment method for the pigment in Synthesis Example 6, an aqueous solution of sodium silicate and water were added to the black pigment "BK-6". The pigment was dispersed in an attritor, followed by the dilution with water. On the side, a dilute aqueous solution of sodium silicate and a dilute aqueous solution of sulfuric acid were provided. The pigment dispersion was heated to 90° C. and its pH was adjusted to 10.0 by addition of a dilute aqueous solution. To the mixture so obtained, the dilute aqueous solution of sodium silicate and the dilute aqueous solution of sulfuric acid, both obtained above, were added dropwise. Subsequent to completion of the addition of both the solutions, stirring was continued for 1 hour, followed by the adjustment of the pH to 6.5–7.0 with dilute sulfuric acid. The slurry so obtained was filtered, and the resulting filter cake was washed and then dried. A silica surface-treated, black, fine particulate compound-oxide pigment (hereinafter called "BK-12") were obtained. The amount of silica so coated was about 30% based on the pigment.

Synthesis Example 13

The compound-oxide black pigment "BK-7" obtained in the form of fine particles in Synthesis Example 7 was surface-treated with melamine resin layers. Specifically, fifty parts of an 70% aqueous solution of methylated methylolmelamine were diluted and dissolved in 50 parts of water. To the solution so obtained, 2.5 parts of glycine, 1.4 parts of a 7% aqueous solution of hydrochloric acid and 10 parts of water were added, followed by reaction at 50°–55° C. After polycondensation was conducted until an initial condensation product crystallized out in chilled water, 7.6 parts of a 20% aqueous solution of sodium hydroxide and 3.5 parts of water were added for neutralization so that the reaction was suspended. The solution had a solid content of about 30% and, even when diluted with water, it remained in a clear solution form. Two hundred parts of the resin solution were added with water to give a total volume of 600 parts, whereby a resin solution of a methylolmelamine initial condensation product was obtained for the treatment of the pigment.

One hundred parts of the compound-oxide black pigment "BK-7" obtained in the form of fine particles in synthesis Example 7 were taken, to which 200 parts of a 10% aqueous solution of methanol, said solution containing 10 parts of an anionic dispersant, were added, whereby the pigment was wetted. Further, 1,700 parts of water were added, followed by thorough deflocculation and dispersion. The resultant dispersion was then charged in a reaction vessel and its pH was adjusted to pH 4.5–5 with an aqueous solution of acetic acid. At 80°–90° C., 600 parts of the above-described resin solution were added dropwise over 4 hours. Further, the pH was adjusted to 4.5–5 with an aqueous solution of acetic acid, followed by stirring for 3 hours to cure coatings. Filtration, water washing and drying were then conducted, whereby 130 parts of a surface-treated, compound-oxide black pigment (hereinafter called "BK-13") were obtained. The amount of the surface treatment material was about 30% based on the pigment. When the frictional electricity of "BK-13" so obtained was measured by the blow-off method, a positive value was indicated so that an improvement in electrical insulating property was observed.

Synthesis Example 14

The compound-oxide black pigment "BK-2" obtained in Synthesis Example 2 was surface-treated with melamine resin films. Specifically, following the treatment method for the pigment in Synthesis Example 13, 100 parts of the copper-chromium compound-oxide black pigment "BK-2" were added with 200 parts of a 10% aqueous solution of methanol, said solution containing 2 parts of an anionic dispersant, whereby the pigment was wetted. Further, 1,700 parts of water were added, followed by thorough deflocculation and dispersion. The resultant dispersion was then charged in a reaction vessel and its pH was adjusted to pH 4.5–5 with an aqueous solution of acetic acid. At 80°–90° C., 300 parts of the pigment-treating resin solution of the methylolmalamine initial condensation product, said resin solution having been employed in Synthesis Example 12, were added dropwise over 2 hours. Further, the pH was adjusted to 4.5–5 with an aqueous solution of acetic acid, followed by stirring for 3 hours to cure coatings. Filtration, water washing and drying were then conducted, whereby 115 parts of a surface-treated, compound-oxide black pigment (hereinafter called "BK-14") were obtained. The amount of the surface treatment material was about 15% based on the pigment. When the frictional electricity of "BK-14" so obtained was measured by the blow-off method, a positive value was indicated so that an improvement in electrical insulating property was observed.

Synthesis Example 15

The compound-oxide black pigment "BK-1" obtained in Synthesis Example 1 was surface-treated with epoxy resin coatings. Specifically, using a reaction product between a liquid epoxy resin composed primarily of bisphenol A diglycidyl ether and sodium aspartate, 300 parts of its 10% aqueous solution were provided as an aqueous epoxy resin solution for the treatment of the pigment. As in Synthesis Example 13, 100 parts of the compound-oxide black pigment "BK-1" were added with a 10% aqueous solution of methanol, said solution containing an anionic dispersant, and also with water, followed by thorough deflocculation and dispersion.

The resultant dispersion was then charged in a reaction vessel. At room temperature, 300 parts of the epoxy resin solution were added dropwise over 1 hour. The resulting mixture was heated to 50° C., at which a 2% aqueous solution of hexamethylenediamine was added dropwise over 1 hour, followed by stirring at 60° C. for 3 hours to cure coatings. Filtration, water washing and drying were then conducted, whereby 115 parts of a surface-treated, compound-oxide black pigment (hereinafter called "BK-15") were obtained. The amount of the surface treatment material was about 15% based on the pigment. When the frictional electricity of "BK-15" so obtained was measured by the blow-off method, a positive value was indicated so that an improvement in electrical insulating property was observed.

Synthesis Example 16

In a manner as in Synthesis Example 1, blue, green and brown pigments, which were composed of compound oxides, respectively, were synthesized.

Specifically, C. I. Pigment Blue 28 composed of a cobalt-aluminum compound oxide was synthesized. Namely, caustic soda was added as a precipitant to an aqueous solution of cobalt sulfate and aluminum sulfate to conduct a precipitation reaction. After filtration, water washing and drying, the resulting filter cake was calcined at 520° C. Primary particles of the thus-obtained blue pigment (hereinafter called "BL-2") had an average particle size of about 0.1 μm.

C.I. Pigment Green 26 composed of a cobalt-aluminum-chromium compound oxide was synthesized. Namely, caustic soda was added as a precipitant to an aqueous solution of cobalt sulfate, aluminum sulfate and chromium sulfate to conduct a precipitation reaction. After filtration, water washing and drying, the resulting filter cake was calcined at 520° C. Primary particles of the thus-obtained green pigment (hereinafter called "GR-2") had an average particle size of about 0.2 $\mu$m.

C.I. Pigment Brown 33 composed of an iron-zinc-chromium compound oxide was synthesized. Namely, caustic soda was added as a precipitant to an aqueous solution of iron sulfate, zinc sulfate and chromium sulfate to conduct a precipitation reaction. After filtration, water washing and drying, the resulting filter cake was calcined at 520° C. Primary particles of the thus-obtained brown pigment (hereinafter called "BR-1") had an average particle size of about 0.2 $\mu$m.

EXAMPLE 1

To fabricate an LC display having a color filter which was provided with a black matrix, pigments, that is, the compound-oxide black pigment "BK-1" obtained in Synthesis Example 1, a red pigment "R-1", a green pigment "G-1" and a blue pigment "BL-1" were separately dispersed in portions of a photosensitive resin varnish composed primary of a polyurethane acrylate resin by a three-roll mill, whereby four UV-curing, colored compositions were prepared. Proportioning was conducted in accordance with the following formula.

| Component | Bk | R | G | B |
|---|---|---|---|---|
| Compound-oxide black pigment "BK-1" | 25 | — | — | — |
| Red pigment "R-1" (C. I. Pigment Red 149) | — | 15 | — | — |
| Green pigment "G-1" (C. I. Pigment Green 36) | — | — | 20 | — |
| Blue pigment "BL-1" (C. I. Pigment Blue 15) | — | — | — | 10 |
| Polyurethane acrylate resin varnish | 30 | 30 | 30 | 30 |
| Trimethylolpropane triacrylate | 10 | 10 | 10 | 10 |
| Neopentyl glycol diacrylate | 5 | 5 | 5 | 5 |
| Hydroxy-2-methylpropylphenone | 2 | 2 | 2 | 2 |
| 2,2-Diethoxyacetophenone | 1 | 1 | 1 | 1 |
| Isopropyl alcohol | 13 | 20 | 17 | 23 |
| Toluene | 7 | 10 | 8 | 12 |
| Ethyl acetate | 7 | 7 | 7 | 7 |
| Total | 100 | 100 | 100 | 100 |

To investigate performance as a black matrix for an LC display, the above black-matrix-forming composition was coated by a roll coater on a glass substrate, which had been subjected to surface treatment with a silane coupling agent, over the entire surface thereof to a wet thickness of 5 $\mu$m, followed by predrying at 60° C. for 5 minutes. Full-surface exposure was conducted at a light quantity of 400 mJ/cm$^2$ under a 250 W extra-high pressure mercury lamp. The blackness of the resultant coating film was measured by a Macbeth densitometer. A value of 3.0 was indicated. The glass substrate with the coating film formed thereon was placed in front of a fluorescent lamp to investigate its light shielding property. Light from the lamp was completely shielded, thereby demonstrating excellent performance as a black matrix.

Next, a color filter provided with a black matrix was fabricated. Namely, the above black-matrix-forming composition was coated as a first color by a roll coater on a glass substrate, which had been subjected to surface treatment with the silane coupling agent, to a wet thickness of 5 $\mu$m, followed by predrying at 60° C. for 5 minutes. Thereafter, a photomask having a grid pattern thereon was brought into close contact with the thus-coated glass substrate, followed by exposure at 400 mJ/cm$^2$ under a 250 W extra-high pressure mercury lamp. Unexposed portions were then washed away with a developer which contained isopropyl alcohol, toluene and ethyl acetate as principal components. After rinsed with isopropyl alcohol, the coating layer was dried by dry air so that a grid-shaped black matrix having a line width of 50 $\mu$m was obtained.

On the glass substrate with the grid-shaped black matrix formed thereon as described above, the R, G and B inks were uniformly coated one ink after another as second, third and fourth colors, respectively, by a roll coater as in the case of the black-matrix-forming composition so that the three colors of R, G and B are cyclically arranged in the resulting black matrix grid and no regions of the same color are located adjacent to each other. Using photomasks for R, G and B, exposure was conducted to form an R, G and B mosaic pattern so that an R, G and B color filter provided with the black matrix was obtained.

Following a conventional method, an oriented film for LCD was formed on the color filter substrate obtained as described above. Rubbing, printing of seals, and formation of transfer electrodes were then conducted. On the side, TFT elements and an oriented film for LCD were formed on an array substrate. Rubbing was conducted and a spacer was then spread. The array substrate and the color filter substrate were bonded together. Injection of a liquid crystal, sealing and bonding of polarizers were then conducted, whereby a color LC panel was obtained. Through a module assembly step in which an integrated driver circuit and an integrated control circuit were connected to the color LC panel and an illuminating backlight or the like is mounted, an LC color display was fabricated.

Since the individual R, G and B colors were isolated from each other by the black matrix, the thus-obtained LC color display was able to form a vivid image with good color reproducibility without overlapping of the individual colors.

EXAMPLE 2

Similarly to Example 1, an LC display having a color filter provided with a black matrix was fabricated. Specifically, 35 parts of the compound-oxide black pigment "BK-8" obtained in Synthesis Example 8 were used instead of "BK-1". By a dispersion mixer, a black-matrix-forming UV-curing composition was prepared in accordance with the following formula:

| | Parts |
|---|---|
| "BK-8" | 35 |
| Polyurethane acrylate resin varnish | 25 |
| Trimethylolpropane triacrylate | 8 |
| Neopentyl glycol diacrylate | 4 |
| 2-Hydroxy-2-methylpropylphenone | 1.8 |
| 2,2-Diethoxyacetophenone | 0.9 |
| Isopropyl alcohol | 13.7 |
| Toluene | 6.8 |
| Ethyl acetate | 4.8 |

The above black-matrix-forming composition was coated to a wet thickness of 3 $\mu$m by a roll coater on a surface-treated glass substrate, followed by exposure and insolubilization. The optical density of the resultant coating film was 2.9. The coating film had high surface resistance so that sufficient electrical insulating property was exhibited. It also had high light shielding property. It therefore demonstrated to have excellent performance as a black matrix.

Next, a color filter provided with a black matrix was fabricated. Namely, the above black-matrix-forming composition was coated by a roll coater on a surface-treated glass substrate to give a wet thickness of 3 μm. Subsequent to predrying, a photomask was applied in close contact with the thus-coated glass substrate. Under an extra-high pressure mercury lamp, the coating layer was subjected to exposure and insolubilization. Unexposed portions were then washed away. The thus-exposed coating layer was rinsed and dried, whereby a grid-shaped black matrix having a line width of 50 μm was obtained.

Using the R, G and B inks and B, G and R photomasks employed in Example 1, a color filter having an R, G and B mosaic pattern was next obtained. Thereafter, an LC color display was fabricated in a usual manner. Since the individual R, G and B colors were isolated from each other by the black matrix, the LC color display was able to form a vivid image having high color purity, high contrast and excellent luminance.

EXAMPLE 3

Similarly to Example 1, an LC display having a color filter provided with a black matrix was fabricated. Specifically, the compound-oxide black pigment "BK-10", which had been obtained in Synthesis Example 10 and surface-treated with the siliceous material, was used instead of "BK-1" employed in Example 1. Using the pigment, polyurethane acrylate resin varnish, polyacrylate monomers, photopolymerization catalyst and solvents in the same proportions, a black-matrix-forming UV-curing composition was prepared by a dispersion mixer.

The above black-matrix-forming composition was coated to a wet thickness of 3 μm by a roll coater on a surface-treated glass substrate, followed by exposure and insolubilization. The optical density of the resultant coating film was 2.6. The coating film had high surface resistance so that sufficient electrical insulating property was exhibited. It also had high light shielding property. It therefore demonstrated to have excellent performance as a black matrix.

Next, a color filter provided with a black matrix was fabricated. Namely, the above black-matrix-forming composition was coated by a roll coater on a surface-treated glass substrate to give a wet thickness of 3 μm. Subsequent to predrying, a photomask was applied in close contact with the thus-coated glass substrate. Under an extra-high pressure mercury lamp, the coating layer was subjected to exposure and insolubilization. Unexposed portions were then washed away. The thus-exposed coating layer was rinsed and dried, whereby a grid-shaped black matrix having a line width of 50 μm was obtained. Using the R, G and B inks and B, G and R photomasks employed in Example 1, a color filter having an R, G and B mosaic pattern was next obtained. Thereafter, an LC color display was fabricated in a usual manner. Since the individual R, G and B colors were isolated from each other by the black matrix, the LC color display was able to form a vivid image having high color purity, high contrast and excellent luminance.

EXAMPLE 4

Similarly to Example 1, an LC display having a color filter provided with a black matrix was fabricated. Specifically, the compound-oxide black pigment "BK-14", which had been obtained in Synthesis Example 14 and surface-treated with the resin, was used instead of "BK-1" employed in Example 1. Using the pigment, polyurethane acrylate resin varnish, polyacrylate monomers, photopolymerization catalyst and solvents in the same proportions, a black-matrix-forming UV-curing composition was prepared by a dispersion mixer.

The above black-matrix-forming composition was coated to a wet thickness of 5 μm by a roll coater on a surface-treated glass substrate. Subsequent to pre-drying, exposure and insolubilization were conducted. The optical density of the resultant coating film was 3.1. The coating film had high surface resistance so that sufficient electrical insulating property was exhibited. It also had high light shielding property. It therefore demonstrated to have excellent performance as a black matrix.

Next, a color filter provided with a black matrix was fabricated. Namely, the above black-matrix-forming composition was coated by a roll coater on a surface-treated glass substrate to give a wet thickness of 5 μm. Subsequent to predrying, a photomask was applied in close contact with the thus-coated glass substrate. Under an extra-high pressure mercury lamp, the coating layer was subjected to exposure and insolubilization. Unexposed portions were then washed away. The thus-exposed coating layer was rinsed and dried, whereby a grid-shaped black matrix having a line width of 50 μm was obtained.

Using the R, G and B inks and B, G and R photomasks employed in Example 1, a color filter having an R, G and B mosaic pattern was next obtained. Thereafter, an LC color display was fabricated in a usual manner. Since the individual R, G and B colors were isolated from each other by the black matrix, the LC color display was able to form a vivid image having high color purity, high contrast and excellent luminance.

EXAMPLE 5

Similarly to Example 1, an LC display having a color filter provided with a black matrix was fabricated. Specifically, the compound-oxide black pigment "BK-15", which had been obtained in Synthesis Example 15 and surface-treated with the resin, was used instead of "BK-1" employed in Example 1. Using the pigment, polyurethane acrylate resin varnish, polyacrylate monomers, photopolymerization catalyst and solvents in the same proportions, a black-matrix-forming UV-curing composition was prepared by a dispersion mixer.

The above black-matrix-forming composition was coated to a wet thickness of 5 μm by a roll coater on a surface-treated glass substrate. Subsequent to pre-drying, exposure and insolubilization were conducted. The optical density of the resultant coating film was 2.9. The coating film had high surface resistance so that sufficient electrical insulating property was exhibited. It also had high light shielding property. It therefore demonstrated to have excellent performance as a black matrix.

Next, a color filter provided with a black matrix was fabricated. Namely, the above black-matrix-forming composition was coated by a roll coater on a surface-treated glass substrate to give a wet thickness of 5 μm. Subsequent to predrying, a photomask was applied in close contact with the thus-coated glass substrate. Under an extra-high pressure mercury lamp, the coating layer was subjected to exposure and insolubilization. Unexposed portions were then washed away. The thus-exposed coating layer was rinsed and dried, whereby a grid-shaped black matrix having a line width of 50 μm was obtained.

Using the R, G and B inks and B, G and R photomasks employed in Example 1, a color filter having an R, G and B mosaic pattern was next obtained. Thereafter, an LC color display was fabricated in a usual manner. Since the individual R, G and B colors were isolated from each other by the black matrix, the LC color display was able to form a vivid image having high color purity, high contrast and excellent luminance.

EXAMPLE 6

Similarly to Example 1, an LC display having a color filter provided with a black matrix was fabricated. Specifically, 20 parts of the compound-oxide black pigment "BK-10", which had been obtained in Synthesis Example 10, and 10 parts of a below-described carbon black pigment, which had been surface-treated with a siliceous material, were used instead of "BK-1" employed in Example 1. By a dispersion mixer, a black-matrix-forming UV-curing composition was prepared in accordance with the following formula:

|  | Parts |
| --- | --- |
| "BK-10" | 20 |
| Surface-treated carbon black pigment | 10 |
| Polyurethane acrylate resin varnish | 25 |
| Trimethylolpropane triacrylate | 8 |
| Neopentyl glycol diacrylate | 4 |
| 2-Hydroxy-2-methylpropylphenone | 1.8 |
| 2,2-Diethoxyacetophenone | 0.9 |
| Isopropyl alcohol | 16.3 |
| Toluene | 8 |
| Ethyl acetate | 6 |

The above black-matrix-forming composition was coated by a roll coater on a surface-treated glass substrate. Subsequent to predrying, exposure and insolubilization were conducted. The optical density of the resultant coating film was 3.5. The coating film had high surface resistance so that sufficient electrical insulating property was exhibited. It also had high light shielding property. It therefore demonstrated to have excellent performance as a black matrix.

Next, a color filter provided with a black matrix was fabricated. Namely, the above black-matrix-forming composition was coated by a roll coater on a surface-treated glass substrate. Subsequent to predrying, a photomask was applied in close contact with the thus-coated glass substrate, followed by exposure and insolubilization. Unexposed portions were then washed away. The thus-exposed coating layer was rinsed and dried, whereby a grid-shaped black matrix having a line width of 50 μm was obtained. Using the R, G and B inks and B, G and R photomasks employed in Example 1, similar operations were conduced so that a color filter having an R, G and B mosaic pattern was obtained.

Then, an LC color display was fabricated in a usual manner.

Since the individual R, G and B colors were isolated from each other by a black matrix, the above-obtained LC color display was able to form a vivid image having high color purity, high contrast and excellent luminance.

The surface-treated carbon black pigment employed as described above had been obtained as in Synthesis Example 3 by subjecting a carbon black pigment (C.I. Pigment Black 7) to surface treatment with a siliceous material in an amount of about 20% based on the pigment.

EXAMPLE 7

To fabricate an LC display having a color filter provided with a black matrix, 30 parts of the fine particulate, compound-oxide black pigment "BK-4" obtained in Synthesis Example 4 were added to and mixed with a photosensitive resin varnish which was composed of 23 parts of a methacrylate ester-methacrylic acid copolymer resin of the alkaline development type, 10 parts of pentaerythritol triacrylate, 5 parts of diethylene glycol diacrylate and 30 parts of propylene glycol monomethyl ether acetate. The pigment was dispersed in a ball mill. Further, 5 parts of a photopolymerization initiator were added and mixed, whereby a black-matrix-forming UV-curing composition was prepared.

The above black-matrix-forming composition was coated by a roll coater to a wet thickness of 3 μm on a surface-treated glass substrate. Subsequent to pre-drying, exposure and insolubilization were conducted. The optical density of the resultant coating film was 2.8. The coating film had high surface resistance so that sufficient electrical insulating property was exhibited. It also had high light shielding property. It therefore demonstrated to have excellent performance as a black matrix.

The black-matrix-forming UV-curing composition was coated to a wet thickness of 3 μm on a surface-treated glass substrate by a roll coater. Next, pre-drying was conducted at 60° C. for 5 minutes. A photomask having a grid pattern therein was then brought into close contact with the thus-coated glass substrate. Under a 250 W extra-high pressure mercury lamp, exposure was conducted at a light quantity of 400 mJ/cm$^2$ to insolubilize the coating layer. Unexposed portions were then washed away with a developer which contained sodium carbonate as a principal component in a dilute aqueous solution of isopropyl alcohol. The thus-washed coating layer was dried at 60° C., whereby a grid-shaped pattern was obtained.

The pigments BL-1, G-1 and R-1 employed in Example 1 were then separately added to and mixed with portions of the above-described photosensitive resin varnish. Using ball mills, the pigments were separately dispersed and a photopolymerization initiator was then added and mixed, so that UV-curing R, G and B inks were prepared. To form an R, G and B pattern similar to that obtained in Example 1, operations were conducted as described above, using the R, G and B inks and B, G and R photomasks, a color filter having an R, G and B mosaic pattern was obtained. An LC color display was then fabricated in a usual manner. Since the individual R, G and B colors were isolated from each other by the black matrix, the LC color display so obtained was able to form a vivid image having high color purity, high contrast and excellent luminance.

EXAMPLE 8

To fabricate an LC display having a color filter which was provided with a black matrix, pigments, that is, the compound-oxide black pigment "BK-2" obtained in Synthesis Example 2 and the pigments "R-1", "G-1" and "BL-1" of the individual colors used in Example 1 were separately dispersed by a three-roll mill in portions of a photosensitive aromatic polyimide resin varnish containing a photosensitizer in accordance with the below-described formula, whereby photosensitive compositions of the four colors were prepared for a color filter.

| Component | Bk | R | G | B |
| --- | --- | --- | --- | --- |
| Compound-oxide black pigment "BK-82" | 20 | — | — | — |
| Red pigment "R-1" (C. I. Pigment Red 149) | — | 10 | — | — |
| Green pigment "G-1" (C. I. Pigment Green 36) | — | — | 10 | — |
| Blue pigment "BL-1" (C. I. Pigment Blue 15) | — | — | — | 10 |
| Photosensitive polyimide resin varnish | 50 | 50 | 50 | 50 |
| N-Methyl-2-pyrrolidone | 30 | 40 | 40 | 40 |
| Total | 100 | 100 | 100 | 100 |

To investigate performance as a black matrix, a glass plate which had been treated with a silane coupling agent was mounted on a spinner and the above-described black-matrix-forming composition according to the present invention was spin-coated. The spin coating was conducted first at 1,000 rpm for 5 seconds and then at 2,000 rpm for 5 seconds.

Pre-baking was next conducted at 65° C. for 30 seconds. Using an extra-high pressure mercury lamp, full-surface exposure was conducted at a light quantity of 900 mJ/cm$^2$. The coating layer was subjected to post-baking at 200° C. for 30 minutes and then at 300° C. for 60 minutes. The blackness of the resultant coating film was measured by a Macbeth densitometer. A value of 2.9 was indicated. The glass substrate with the coating film formed thereon was placed in front of a fluorescent lamp to investigate its light shielding property. Light from the lamp was completely shielded, thereby demonstrating excellent performance as a black matrix.

Next, a color filter provided with a black matrix was fabricated. A glass plate which had been treated with the silane coupling agent was mounted on a spinner and the above-described black-matrix-forming composition according to the present invention was spin-coated. The spin coating was conducted first at 1,000 rpm for 5 seconds and then at 2,000 rpm for 5 seconds. Pre-baking was next conducted at 65° C. for 30 seconds. A photomask having a grid pattern was applied in close contact with the thus-coated glass plate. Using an extra-high pressure mercury lamp, full-surface exposure was conducted at a light quantity of 900 mJ/cm$^2$. The resulting coating layer was developed with a specially-prepared developer and then washed with a specially-prepared rinse, followed by post-baking at 200° C. for 30 minutes and then at 300° C. for 60 minutes. A glass substrate provided with a grid-shaped black matrix pattern having a line width of 20 μm was obtained.

Using a blue color composition as a second color, a green color composition as a third color and a red color composition as a fourth color, operations similar to those conducted with the black matrix composition according to the present invention were repeated three times, so that a color filter having a mosaic pattern was obtained. Next, a LC color display was fabricated in a usual manner. As the individual R, G and B colors did not overlap, the LC color display was excellent in color-light separability and luminance and was able to form a very vivid image.

EXAMPLE 9

A LC display having a color filter provided with a black matrix was fabricated in a similar manner as in Example 8. In place of "BK-2" used in Example 8, 30 parts of the surface-treated, compound-oxide black pigment "BK-11" obtained in Synthesis Example 11 were dispersed in a mixture which consisted of 45 parts of a photosensitive polyimide resin varnish containing a photosensitizer and 25 parts of N-methyl-2-pyrrolidone.

The above black-matrix-forming composition according to the present invention was spin-coated on a surface-treated glass substrate. The coating layer was subjected to pre-baking, exposure and post-baking. The optical density of the resultant coating film was 2.8. The coating film had high surface resistance so that sufficient electrical insulating property was exhibited. It also had high light shielding property. It therefore demonstrated to have excellent performance as a black matrix.

Next, a color filter provided with a black matrix was fabricated. Specifically, the black-matrix-forming composition according to the present invention was spin-coated on a surface-treated glass substrate. Subsequent to pre-baking, a photomask was applied in close contact with the thus-coated glass substrate, followed by exposure and insolubilization, development and washing, and post-baking. A glass substrate provided with a grid-shaped black matrix pattern having a line width of 20 μm was obtained. Using the R, G and B colored compositions employed in Example 8, similar operations were conducted so that a color filter provided with an R, G and B mosaic pattern was obtained.

An LC color display was then fabricated in a usual manner. Since the individual R, G and B colors were isolated from each other by the black matrix, the color display so obtained was able to form a vivid image having high color purity, high contrast and excellent luminance.

EXAMPLE 10

Twenty-five parts of the compound-oxide black pigment "BK-5", which had been obtained in Synthesis Example 5, were added to and mixed with a photosensitive resin varnish which was composed of 10 parts of the styrene-methacrylate ester-methacrylic acid copolymer resin of the alkaline development type, 5 parts of pentaerythritol triacrylate, 2 parts of diethylene glycol diacrylate and 56 parts of propylene glycol monomethyl ether acetate. The pigment was dispersed in a ball mill. Further, 2 parts of the photopolymerization initiator were added and mixed, whereby a black-matrix-forming UV-curing composition according to the present invention was prepared.

The above black-matrix-forming composition according to the present invention was spin-coated to a wet thickness of 3 μm on a surface-treated glass substrate, first at 200 rpm for 30 seconds and then at 1,200 rpm for 5 seconds. The coating layer was subjected to pre-baking, exposure and post-baking. The optical density of the resultant coating film was 3.2. The coating film had high surface resistance so that sufficient electrical insulating property was exhibited. It also had high light shielding property. It therefore demonstrated to have excellent performance as a black matrix.

A surface-treated glass substrate was mounted on a spin coater, and the above-described black-matrix-forming UV-curing composition was spin-coated to a wet thickness of 3 μm first at 200 rpm for 5 seconds and then at 1,200 rpm for 5 seconds. After pre-baking was conducted at 60° C. for 5 minutes, a photomask having a grid pattern was applied in close contact with the thus-coated glass substrate. Using a 250 W extra-high pressure mercury lamp, exposure was conducted at a light quantity of 400 mJ/cm$^2$ to insolubilize the coating layer. Unexposed portions were then washed away with a developer which contained sodium carbonate as a principal component in a dilute aqueous solution of isopropyl alcohol. The resulting coating layer was dried at 60° C., whereby a grid pattern was obtained.

The pigments "BL-1", "G-1" and "R-1" employed in Example 1 were then separately added to and mixed with portions of the above-described photosensitive resin varnish. Using ball mills, the pigments were separately dispersed and the photopolymerization initiator was then added and mixed, so that UV-curing R, G and B inks were prepared. To form an R, G and B pattern similar to that obtained in Example 1, operations were conducted as described above, using the R, G and B inks and B, G and R photomasks, a color filter having an R, G and B mosaic pattern was obtained. An LC color display was then fabricated in a usual manner. Since the individual R, G and B colors were isolated from each other by the black matrix, the color display so obtained was able to form a vivid image having high color purity, high contrast and excellent luminance.

EXAMPLE 11

To fabricate an LC display having a color filter which was provided with a black matrix, pigments, that is, the compound-oxide black pigment "BK-13" obtained in Synthesis Example 13 and surface-treated with the resin, C.I. Pigment Blue 15 (BL-2) and C.I. Pigment Violet 23 (V-1), and the red pigment "R-1", the green pigment "G-1" and the blue pigment "BL-1" employed in Example 1 were proportioned in accordance with the following formula and then dispersed, whereby black, R, G and B inks were prepared for offset lithographic printing.

| Component | Bk | R | G | B |
| --- | --- | --- | --- | --- |
| Surface-treated, compound-oxide black pigment "BK-13" | 25 | — | — | — |
| Blue pigment "BL-2" | 5 | — | — | — |
| Violet pigment "V-1" | 10 | — | — | — |
| Red pigment "R-1" (C. I. Pigment Red 149) | — | 30 | — | — |
| Green pigment "G-1" (C. I. Pigment Green 36) | — | — | 40 | — |
| Blue pigment "BL-1" (C. I. Pigment Blue 15) | — | — | — | 20 |
| Mixed varnish for offset lithographic inks | 50 | 60 | 50 | 70 |
| Drier | 1 | 1 | 1 | 1 |
| Ink solvent | 9 | 9 | 9 | 9 |
| Total | 100 | 100 | 100 | 100 |

The above mixed varnish for offset lithographic inks has been obtained by using a rosin-modified phenol resin and a drying-oil-modified isophthalic alkyd resin as principal components and adding thereto an ink solvent and aluminum chelate.

To investigate performance as a black matrix, solid printing was conducted with the above black-matrix-forming composition by using an offset press. The optical density of the resultant coating film was 3.0. The coating film had high surface resistance so that sufficient electrical insulating property was exhibited. It also had high light shielding property. It therefore demonstrated to have excellent performance as a black matrix.

Next, a color filter provided with a black matrix was fabricated. Specifically, using the R, G and B inks, an R, G and B pixel pattern in the form of stripes having a line width of 200 μm was formed by a four-color offset press. Further, the black-matrix-forming composition was printed in a pattern such that the black-matrix-forming composition filled up both top and bottom sides and left and right sides of each of the R, G and B stripes, whereby the individual R, G and B pixels were completely isolated by the black matrix. An LC color display was then fabricated in a usual manner.

Since the individual R, G and B colors were isolated from each other by the black matrix, the LC color display so obtained was able to form a vivid image having high color purity, high contrast and excellent luminance.

EXAMPLE 12

To fabricate an LC display having a color filter provided with a black matrix as in Example 11, a black-matrix-forming composition for offset lithographic printing was prepared using the compound-oxide black pigment "BK-10", which had been obtained in Synthesis Example 10 and surface-treated with the siliceous material, in place of "BK-11".

Solid printing was conducted with the above black-matrix-forming composition by using an offset press. The optical density of the resultant coating film was 2.7. The coating film had high surface resistance so that sufficient electrical insulating property was exhibited. It also had high light shielding property. It therefore demonstrated to have excellent performance as a black matrix.

Next, a color filter provided with a black matrix was fabricated. Specifically, using the above-described black-matrix-forming composition in combination with the R, G and B inks employed in Example 11, an R, G and B pixel pattern provided with a black matrix was formed by a four-color offset press. An LC color display was then fabricated in a usual manner. Since the individual R, G and B colors were isolated from each other by the black matrix, the LC color display so obtained was able to form a vivid image having high color purity, high contrast and excellent luminance.

EXAMPLE 13

To fabricate an LC display having a color filter provided with a black matrix as in Example 11, a black-matrix-forming composition for offset lithographic printing was prepared using the compound-oxide black pigment "BK-3", which had been obtained in Synthesis Example 3, in place of "BK-11".

Solid printing was conducted with the above black-matrix-forming composition by using an offset press. The optical density of the resultant coating film was 2.8. The coating film had high surface resistance so that sufficient electrical insulating property was exhibited. It also had high light shielding property. It therefore demonstrated to have excellent performance as a black matrix.

Next, a color filter provided with a black matrix was fabricated. Specifically, using the above-described black-matrix-forming composition in combination with the R, G and B inks employed in Example 11, an R, G and B pixel pattern provided with a black matrix was formed by a four-color offset press. An LC color display was then fabricated in a usual manner. Since the individual R, G and B colors were isolated from each other by the black matrix, the LC color display so obtained was able to form a vivid image having high color purity, high contrast and excellent luminance.

EXAMPLE 14

To fabricate an LC display having a color filter provided with a black matrix as in Example 12, 6 parts of C.I. Pigment Blue 28 ("BL-2") obtained in Synthesis Example 16, 24 parts of C.I. Pigment Green 26 ("GR-2") and 30 parts of C.I. Pigment Brown 33 ("BR-1") were mixed, followed by the further addition of 30 parts of a mixed varnish for offset lithographic inks, 1 part of drier and 9 parts of ink solvent. The pigments were dispersed using a three-roll mill, whereby a black-matrix-forming composition for offset lithographic printing was prepared.

Solid printing was conducted with the above black-matrix-forming composition by using an offset press. The blackness of the resultant coating film was measured by a Macbeth densitometer. A value of 2.9 was indicated. The print was placed in front of a fluorescent lamp to investigate its light shielding property. Light from the lamp was completely shielded, thereby demonstrating excellent performance as a black matrix.

A color filter provided with a black matrix was fabricated. Specifically, using the above-described black-matrix-forming composition in combination with the R, G and B inks employed in Example 11, an R, G and B pixel pattern provided with a black matrix was formed by a four-color offset press.

An LC color display was then fabricated in a usual manner. Since the individual R, G and B colors were isolated from each other by the black matrix, the LC color display so obtained was able to form a vivid image having high color purity, high contrast and excellent luminance.

EXAMPLE 15

To fabricate a display panel provided with a black matrix for use in a plasma display panel, 36 parts of the compound-oxide black pigment "BK-1" obtained in Synthesis Example 1 and 20 parts of a low m.p. glass frit were mixed with 35 parts of a mixed varnish for screen printing inks and 9 parts of ink solvent. The resulting mixture was kneaded in a three-roll mill to thoroughly disperse the pigment, whereby a black-matrix-forming composition was obtained. The mixed varnish for screen printing inks was composed of ethylhydroxyethylcellulose, the pentaerythritol ester of rosin, a petroleum-base solvent and cellosolve as principal components.

To investigate performance as a black matrix for a display panel of a plasma display, the above black-matrix-forming composition was coated to a wet thickness of 3 $\mu$m by a wire bar coater on a glass substrate over the entire surface thereof. The coating layer was dried at 200° C. and in a baking furnace, was then baked at 550° C. for 1 hour in air to burn off organic components. The optical density of the black coating film so obtained was 3.2. The coating film had high light shielding property and also had excellent adhesion to the glass substrate. It therefore demonstrated to have excellent performance as a black matrix.

Next, a display panel provided with a black matrix for use in a plasma display panel was fabricated. Specifically, using the above black-matrix-forming composition, a grid pattern was printed on a front glass substrate by a screen printing machine. The coating layer was dried at 200° C. and in a baking furnace, was then baked at 550° C. for 1 hour in air to burn off organic components, whereby a black matrix was formed. Formed next were transparent electrodes, metal electrodes, a transparent dielectric layer, stripe partitions, seal layers, and a magnesium oxide layer. Formed on a rear glass substrate were data electrodes, a white dielectric layer, stripe partitions, blue, green and red phosphor layers, and seal layers. The thus-formed front glass substrate and rear glass substrate were assembled. Sealing, evacuation and gas filling steps were then performed. The assembly so obtained was connected to a circuit unit so that a display panel for a color plasma display was fabricated.

Individual luminescent colors from the blue, green and red phosphors appear on the front glass substrate in such a way that they are isolated from each other by the grid-shaped black matrix. The thus-obtained display panel for the color plasma display can therefore form a vivid image having high color purity and contrast and excellent luminance.

EXAMPLE 16

To fabricate a display panel provided with a black matrix for use in a plasma display, 40 parts of the black pigment "BK-9" obtained in Synthesis Example 9 and 10 parts of low m.p. glass frit were, as in Example 1, added to and mixed with a photosensitive resin varnish which was composed of 20 parts of a methacrylate ester-methacrylic acid copolymer resin of the alkaline development type, 7 parts of pentaerythritol triacrylate, 3 parts of diethylene glycol diacrylate and 18 parts of propylene glycol monomethyl ether acetate. The pigment was dispersed in a ball mill. Further, 2 parts of a photopolymerization initiator were added and mixed, whereby a black-matrix-forming UV-curing composition was prepared.

The black-matrix-forming UV-curing composition was coated to a wet thickness of 3 $\mu$m on a front glass substrate by a roll coater. Next, predrying was conducted at 60° C. for 5 minutes. A photomask having a grid pattern therein was then brought into close contact with the thus-coated glass substrate. Under a 250 W extra-high pressure mercury lamp, exposure was conducted at a light quantity of 400 mJ/cm² to insolubilize the coating layer. Unexposed portions were then washed away with a developer which contained sodium carbonate as a principal component in a dilute aqueous solution of isopropyl alcohol. The thus-washed coating layer was dried at 60° C., whereby a grid-shaped pattern was obtained. The coating layer was heated at 200° C. and in a baking furnace, was then baked at 550° C. for 1 hour in air to burn off organic components, whereby a black matrix was formed. In a similar manner to Example 1, a display panel for a color plasma display was fabricated.

Individual luminescent colors from the blue, green and red phosphors appear on the front glass substrate in such a way that they are isolated from each other by the grid-shaped black matrix. The thus-obtained display panel for the color plasma display can therefore form a vivid image having high color purity and contrast and excellent luminance.

EXAMPLE 17

To fabricate a display panel provided with a black matrix for use in a plasma display, 25 parts of the black pigment "BK-12" obtained in Synthesis Example 12 and 5 parts of low m.p. glass frit were, as in Example 1, added to and mixed with a photosensitive resin varnish which was composed of 10 parts of a styrene-methacrylate ester-methacrylic acid copolymer resin of the alkaline development type, 5 parts of pentaerythritol triacrylate, 3 parts of diethylene glycol diacrylate and 50 parts of propylene glycol monomethyl ether acetate. The pigment was dispersed in a ball mill. Further, 2 parts of a photopolymerization initiator were added and mixed, whereby a black-matrix-forming UV-curing composition was prepared.

A front glass substrate was mounted on a spin coater, and the above-described black-matrix-forming UV-curing composition was spin-coated to a wet thickness of 3 $\mu$m first at 200 rpm for 5 seconds and then at 1,200 rpm for 5 seconds.

Next, the coating layer was subjected to predrying at 60° C. for 5 minutes. After that, a photomask having a grid pattern was applied in close contact with the thus-coated glass substrate. Using a 250 W extra-high pressure mercury lamp, exposure was conducted at a light quantity of 400 mJ/cm² to insolubilize the coating layer. Unexposed portions were then washed away with a developer which contained sodium carbonate as a principal component in a dilute aqueous solution of isopropyl alcohol. The resulting coating layer was dried at 60° C., whereby a grid pattern was obtained. The coating layer was heated at 200° C. and in a baking furnace, was then baked at 550° C. for 1 hour in air to burn off organic components, whereby a black matrix was formed. In a similar manner to Example 1, a display panel for a color plasma display was fabricated.

Individual luminescent colors from the blue, green and red phosphors appear on the front glass substrate in such a way that they are isolated from each other by the grid-shaped black matrix. The thus-obtained display panel for the color plasma display can therefore form a vivid image having high color purity and contrast and excellent luminance.

It is to be noted that display panels having excellent black matrices and suited for use in color CD displays or color plasma displays can be obtained by using, instead of the compound-oxide black pigments employed in Examples 1–17, other compound-oxide black pigments and following the procedures of these Examples.

We claim:

1. A composition for a black matrix, said composition being composed of a black pigment and a binder for said pigment, wherein said black pigment is a compound-oxide black pigment comprising at least two metal oxides and having a spinel or inverse-spinel crystalline structure.

2. The composition according to claim 1, wherein said compound-oxide black pigment is a compound oxide composed, as principal metal components, of at least two metals selected from the group consisting of copper, chromium, iron, manganese, cobalt, aluminum, nickel, zinc, antimony, titanium and barium.

3. The composition according to claim 1, wherein said compound-oxide black pigment is at least one compound-oxide black pigment selected from the group consisting of compound-oxide black pigments composed of copper and chromium as principal metal components, compound-oxide black pigments composed of copper and manganese as principal metal components, compound-oxide black pigments composed of copper, iron and manganese as principal metal components, compound-oxide black pigments composed of cobalt, chromium and iron as principal metal components, compound-oxide black pigments composed of cobalt, chromium, iron and manganese as principal metal components and compound-oxide black pigments composed of cobalt, nickel, chromium and iron; or a black or dark-colored mixture of at least two pigments selected from the group consisting of brown, green and blue compound-oxide pigments and all said compound-oxide black pigments.

4. The composition according to claim 1, wherein said compound-oxide black pigment has been surface-treated with at least one coating material selected from the group consisting of silicon oxide or vitreous inorganic materials, hardenable polymers, and polymers substantially insoluble in a medium.

5. The composition according to claim 1, wherein said binder is a mixture of an organic binder and a low m.p. glass frit.

6. A process for the formation of a black matrix on a substrate, comprising:

forming a black matrix from a composition comprising a black pigment of a compound-oxide of at least two metal oxides, the black pigment having a spinel or inverse-spinel crystalline structure, admixed with an organic binder and a low m.p. glass frit; and heating said black matrix at a temperature of 450°–900° C. to burn off said organic binder and to fuse said low m.p. glass frit, thereby fixing the compound-oxide black pigment on said substrate.

7. The process according to claim 6, wherein said substrate is a substrate for a color filter of a color LC display.

8. The process according to claim 6, wherein said substrate is a substrate for a display panel of a luminescent flat panel display.

9. An article, comprising:

a substrate and a black matrix formed thereon, said black matrix formed from a composition comprising a compound-oxide black pigment of at least two metal oxides and having a spinel or inverse-spinel crystalline structure, said compound-oxide black pigment being fixed on said substrate with a low m.p. vitreous binder.

10. The article according to claim 9, which is a color LC display.

11. The article according to claim 9, which is a luminescent flat-panel display.

* * * * *